Aug. 11, 1964 G. R. ANDERSON ETAL 3,143,879
METHOD OF AND APPARATUS FOR CORRECTING HEAD TYPE STEAM
FLOW METERS FROM STEAM PRESSURE AND SUPERHEAT
REFERRED TO SUPERHEAT BASE
Filed Nov. 3, 1959 9 Sheets-Sheet 6

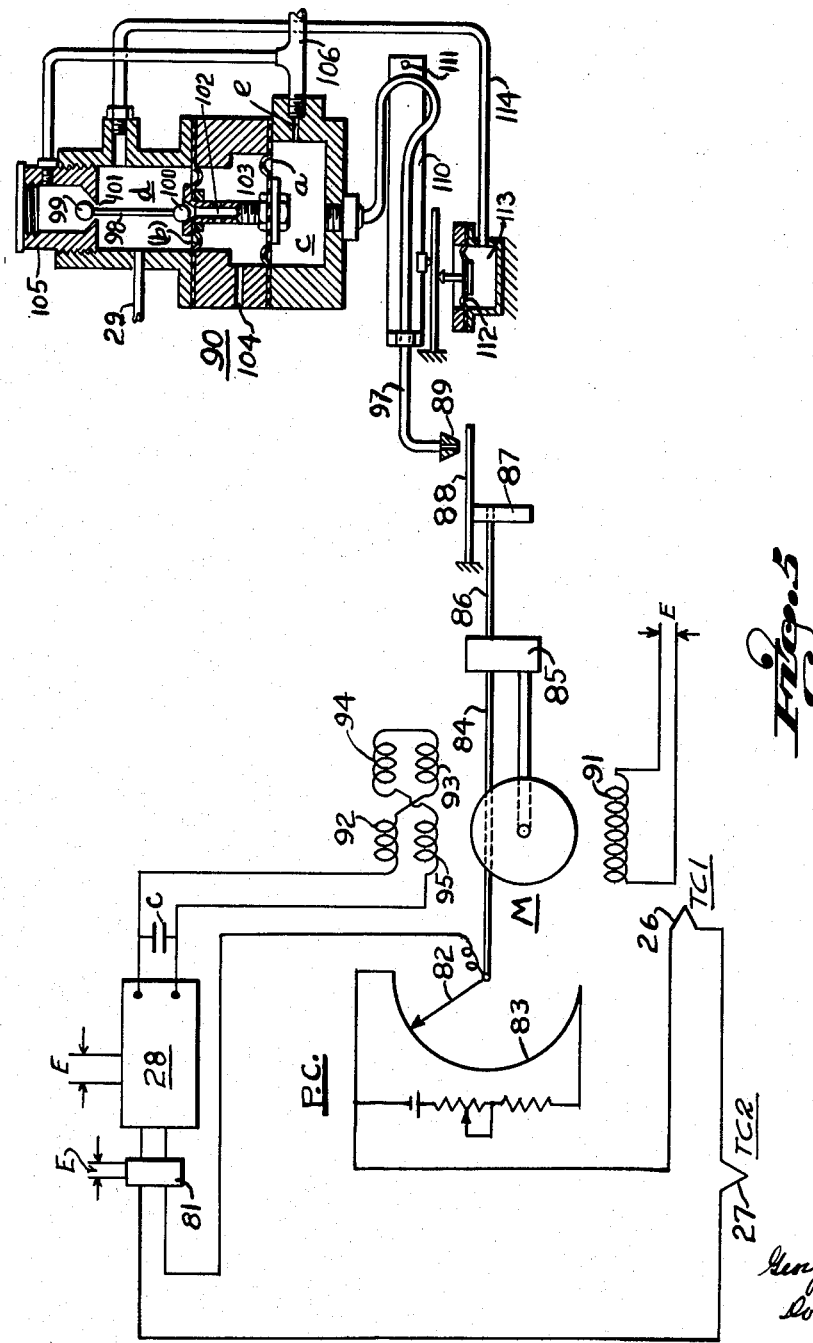

George R. Anderson
Donald M. Stough
INVENTORS

BY Gerald B. Tjoflat
Their attorney

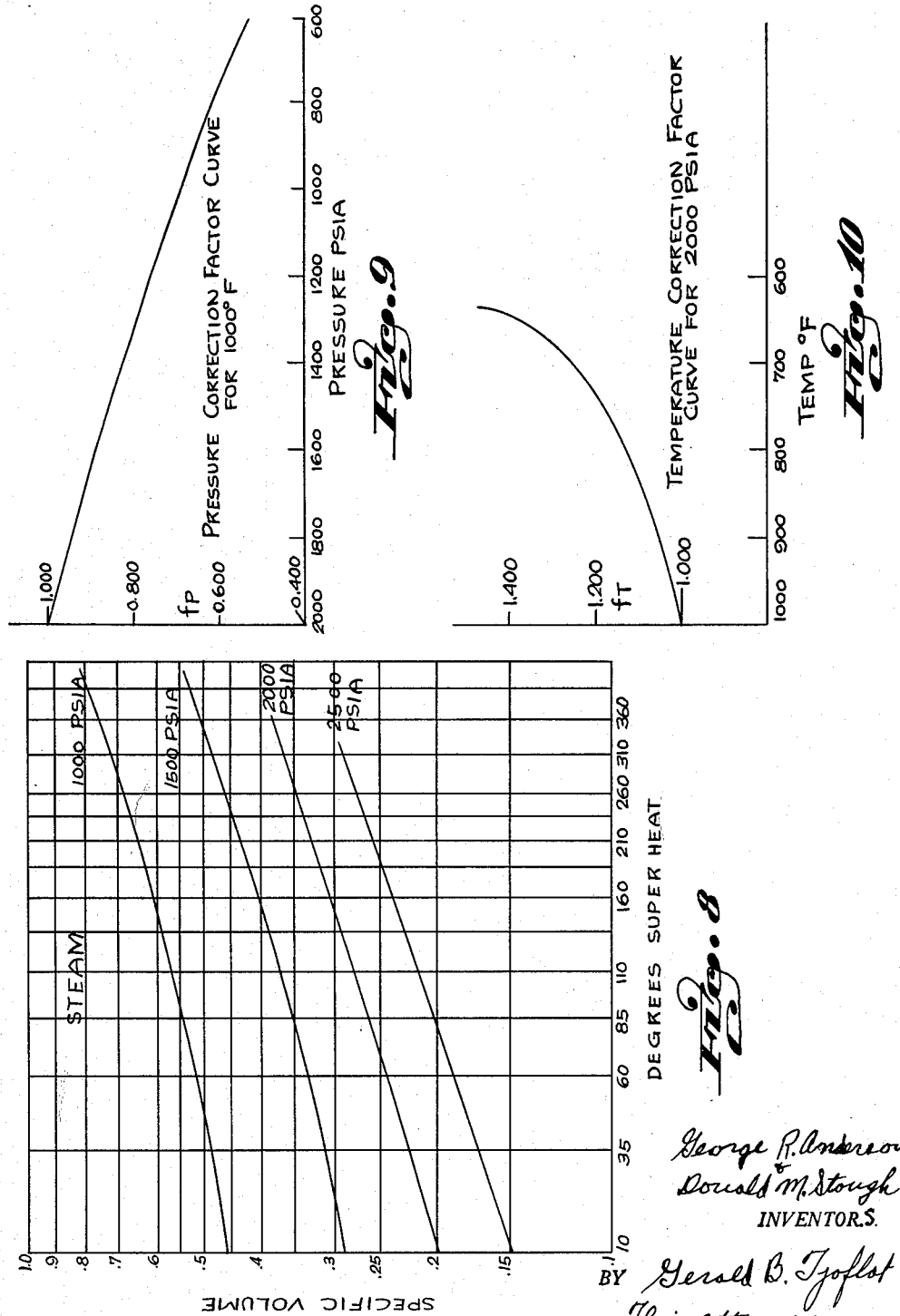

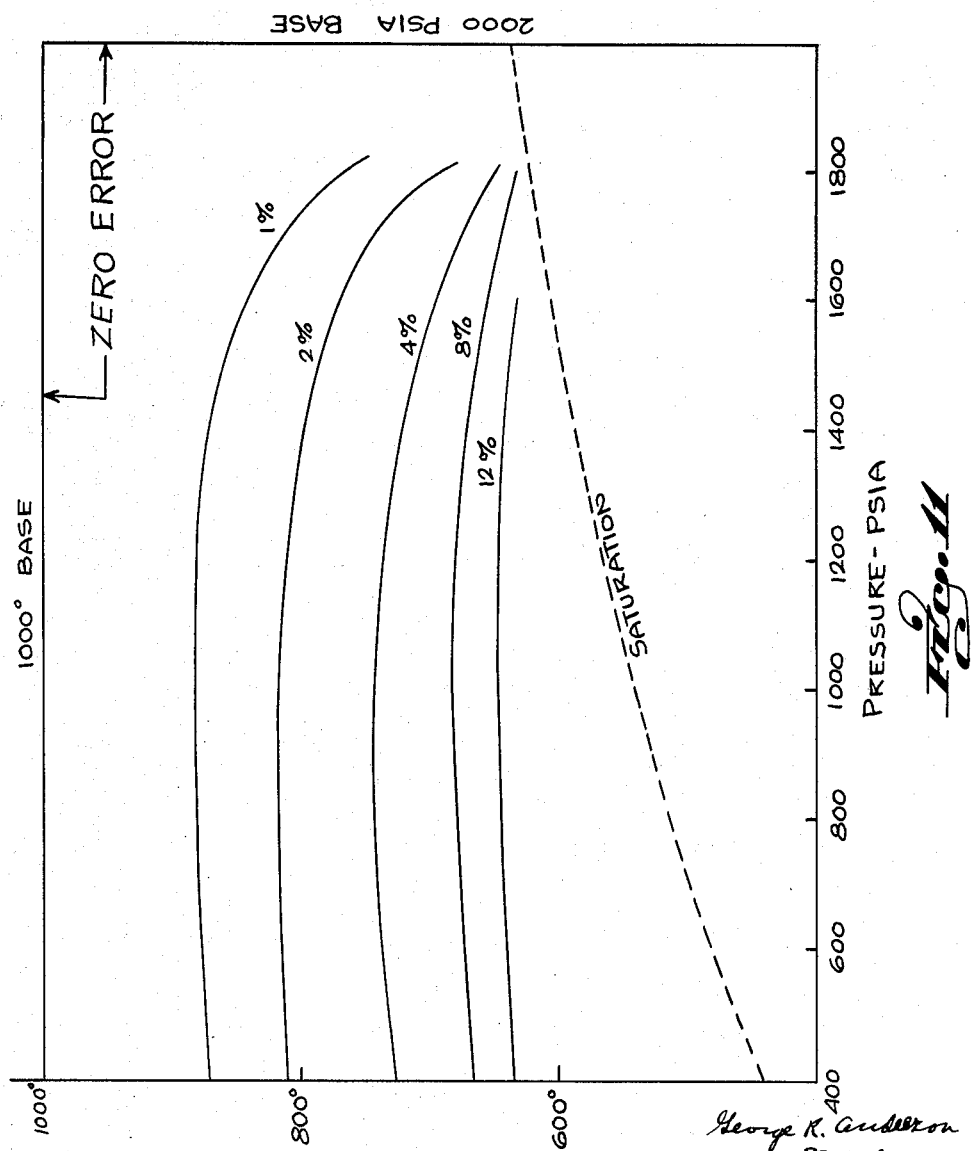

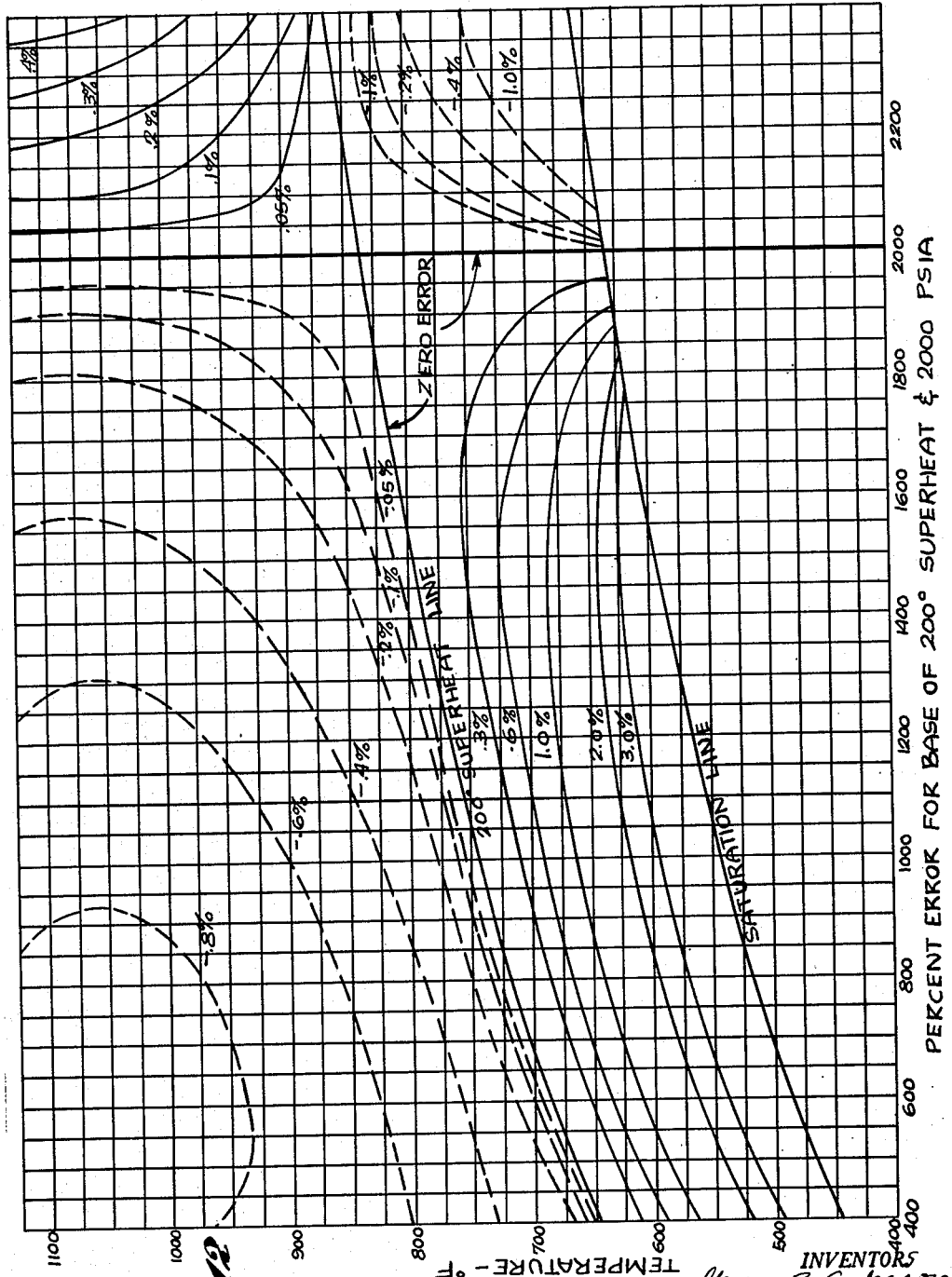

3,143,879
METHOD OF AND APPARATUS FOR CORRECTING HEAD TYPE STEAM FLOW METERS FROM STEAM PRESSURE AND SUPERHEAT REFERRED TO SUPERHEAT BASE

George R. Anderson, Mount Lebanon Township, Allegheny County, and Donald M. Stough, Penn Hills Township, Allegheny County, Pa., assignors, by mesne assignments, to Hagan Controls Corporation, a corporation of Delaware
Filed Nov. 3, 1959, Ser. No. 850,559
4 Claims. (Cl. 73—205)

This invention relates to the art of steam generation and more particularly to a method of and apparatus for accurately measuring the weight of steam flow Q, out of a boiler, where $$Q = K\sqrt{h} \times \sqrt{\frac{V \text{ (base)}}{V \text{ (actual)}}}$$

The derivation of this expression will be explained infra.

Steam flow is usually measured by a head type meter that senses the pressure drop across an orifice, the pressure difference in a venturi, or the pressure drop produced by steam flow resistance of a steam line carrying the steam output from a boiler or from a steam consuming device. Thus, the exhaust steam flow from a high pressure turbine that feeds a low pressure turbine may also be measured.

Steam flow meters actuate linkages by which pen arms and other accessories of such meters are actuated. The pressure drop across such an orifice is not of itself an accurate measure of steam flow. Heretofore, it had been customary to correct the steam flow indication of a head type meter attributable to pressure drop, or other pressure difference indicative of steam flow, by providing such meter with steam pressure and temperature corrective devices. The steam pressure corrective device responded to static pressure in the steam line at a selected distance upstream from an orifice or venturi, whereby a steam pressure correction factor was obtained; the steam temperature corrective device responded to total steam temperature at a selected distance downstream of the orifice, and developed a temperature correction factor. These correction factor devices interacted to develop a resultant correction factor by which the steam flow indicator of the meter was so actuated as to give a corrected indication of the weight of steam flow.

A head type steam flow meter which is corrected for pressure and total steam temperature as above related, is disclosed by Bulletin M-51 published by Hagan Corporation (by change of name, Hagan Controls, Inc., of Pittsburgh, Pennsylvania, the assignee of this application.

Temperature and pressure correction factors as heretofore developed for head type steam flow meters were not accurate in that important factors were not accounted for in deriving a correction factor that conformed closely to steam table values for specific volume when considering extreme changes in pressure and temperature. In other words, the meters were not corrected by a factor which is proportional to $(fp \times f\Delta T)$ where $fp$ is the correction factor for pressure at a base superheat and $(f\Delta T)$ is the correction factor for superheat with respect to a base superheat.

In a given boiler installation, the saturated steam temperature remains relatively constant over a wide range of pressure whereas the superheat temperature may vary over a considerable range. That is particularly true in the case of large high pressure boilers that are started up and deliver steam at relatively low pressure to a turbine, the pressure rising as the boiler is brought up to load. In that type of boiler it is quite essential to know the output of the boiler from start-up to full load. Not only is it important to known the steam output rate at all times, but it is also vital that the rate of input of feed water matches the steam output rate.

Theoretical and practical applications of steam table values with reference to the behaviour of a perfect gas, and which are involved in the pressure temperature correction factors of head type meters to which this application relates, is discussed infra immediately following the description of the several views of the drawing.

An object of this invention is to provide temperature and pressure correction for head type steam flow meters by a factor that is proportional to the product of $(fp) \times (f\Delta T)$ where $fp$ is the correction factor for steam pressure at a base super heat and $f\Delta T$ is the correction factor for super heat with respect to a base super heat.

Another object of the invention is to provide a method and means of measuring super heat as a function of the difference between the super heat temperature and the saturated steam temperature in a steam line.

A still further object of the invention is to provide a means of readily establishing a condition in conjunction with a steam line whereby saturated steam temperatures and super heat temperatures may be readily and conveniently established and measured.

A still further object of the invention is to provide a method and means for so correcting head-type steam flow meters that the indicator of the meter will register the weight of steam flow in accordance with the relation $$Q = K\sqrt{h} \times \sqrt{\frac{V \text{ (base)}}{V \text{ (actual)}}}$$

where $Q$ = the true flow of steam in pounds/hour; $h$ = the head pressure acting on the primary element of the head-type meter which is responding to a pressure differential; and $V$ = the specific volume of steam in cubic feet/pound.

A further object is to provide a method and means of correcting a head-type steam flow meter by the factors $$(fp) \times (f\Delta T) = \sqrt{\frac{V \text{ (base)}}{V \text{ (actual)}}} = K \times \sqrt{1/V} \text{(actual)}$$

where $fp$ is a function of the steam pressure and $f\Delta T$ is a function of the steam super heat.

Other objects of the invention will in part be apparent and will in part, be obvious, to those of ordinary skill in the art to which the invention pertains from the following description taken in conjunction with the accompanying drawings.

In the drawings:

FIGURE 1 is a more or less diagrammatic view of a steam boiler supplying steam to a high pressure turbine, the exhaust steam of which is preheated and then supplied to a low pressure turbine, head type steam flow meters being provided in the lines supplying the high and low pressure turbines, both meters being provided with means responsive to steam pressure and to super heat with reference to a base super heat for correcting the flow meter indications;

FIG. 2 is a more or less diagrammatic view of a steam boiler provided with a reheater for reheating the exhaust steam from a high pressure turbine and supplying the reheated steam to a low pressure turbine, the line to the low pressure turbine being provided with means for simulating actual saturated and superheat temperatures by which the steam flow meter reading may be corrected for superheat temperature with reference to a base temperature;

FIG. 5 is a more or less diagrammatic view of means for measuring superheat temperatures by sensing saturated and superheat temperatures by means of thermocouples and converting the voltage difference into a temperature correction factor signal for a meter such as the one shown in FIG. 4, the correction factor being proportional to $(f\Delta T)$ with reference to a base superheat;

FIG. 8 is a graph showing the relationship between specific volume and degrees of superheat for the same values of pressure as given in FIGS. 6 and 7;

FIG. 9 is a graph showing the pressure correction factor curve at 1000° F. over a range of pressures;

FIG. 10 illustrates a temperature correction factor curve at a pressure of 2000 p.s.i.a. over a range of temperatures;

FIG. 11 is a graph showing the percentage error encountered over a range of pressures and temperatures using the standard art for automatic compensation with reference to FIGS. 9 and 10;

FIG. 12 is a graph showing a family of curves illustrating the percentage of error with reference to a temperature range at a base of 200° superheat and a base pressure of 2000 p.s.i.a.

Considerations concerning perfect gases and steam will be discussed in the following with reference to FIGS. 6–12, both inclusive, and certain tables infra, before describing the method of the invention and the means of correcting steam flow measurements of head-type meters from pressure and superheat with reference to a base superheat.

Many gases in common use, including low pressure steam, behave sufficiently like the so-called perfect gas to permit compensating mechanisms for steam flow meters of the heat type, to be designed according to Boyle's and Charles' Laws without introducing appreciable errors.

High pressure steam is a rather spectacular law breaker, however. Its specific volume varies with temperature and pressure in patterns which are more easily described by steam tables and do not conform to any simple mathematical relationships, such as $PV/T=a$ constant.

Figure 7:
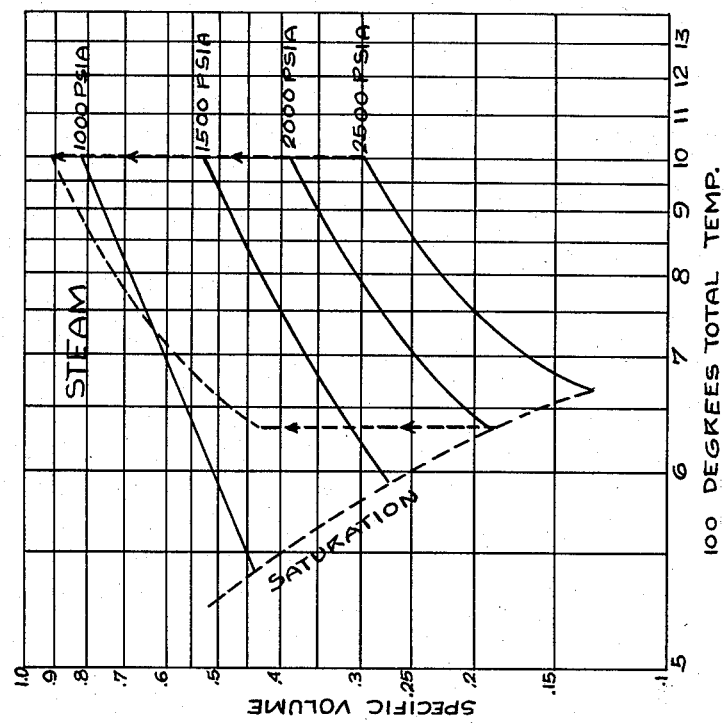
FIG. 7 is a graph showing the relation between specific volume of steam with reference to the degrees of total temperature for the same values of pressure as those given in FIG. 6.
Figure 6:
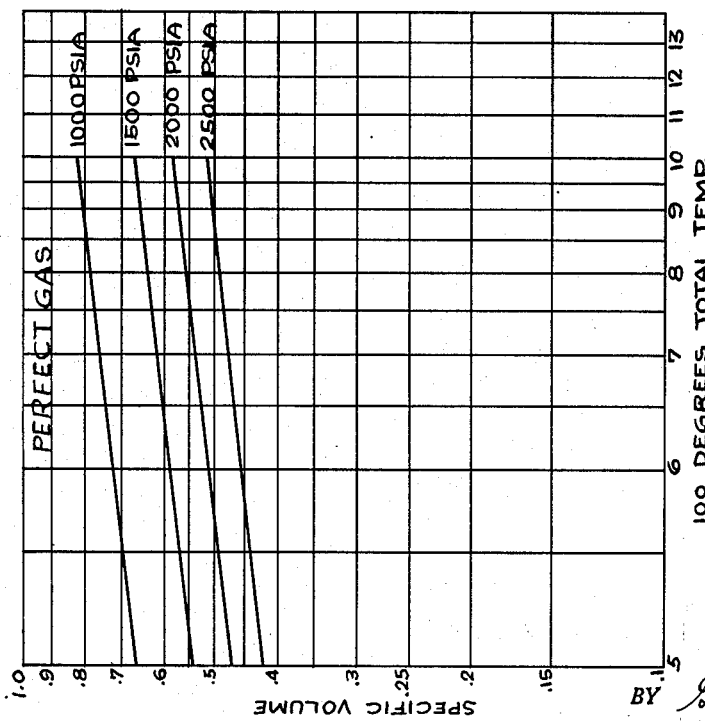
FIG. 6 is a graph illustrating the specific volume of a perfect gas with respect to total temperature at various stated pressures.

To illustrate the difference between a perfect gas and steam, FIGURE 6 shows the behaviour of a perfect gas contrasted with the behaviour of high pressure steam as illustrated in FIG. 7. Specific volume changes are plotted against total temperature for various pressures, on double-log paper in order to emphasize the differences by producing a series of parallel straight lines for the perfect gas, whereas the curves for high pressure steam change in slope and curvature from one pressure to another. This gives rise to problems in design of compensating mechanisms for use over wide range variations of pressure and temperature with high pressure steam.

The problem of shaping or characterizing the compensator for a head-type steam flow meter is complex. If the temperature compensation is characterized to follow accurately the correction factor against a total temperature curve at 2000 p.s.i.a., the proper correction may be made throughout a wide range of temperatures so long as operation of a steam boiler is kept at 2000 p.s.i.a.

In the case of a perfect gas, this characterization will also be suitable at any other operating pressure. But with high pressure steam it is quite apparent that a temperature compensator which is shaped or characterized to be correct at 2000 p.s.i.a., will give considerable error at extremes of temperature when a boiler is operating at 1000 p.s.i.a. for instance. The extent of this aberration is shown in FIG. 7 by superimposing the 2000 p.s.i.a. curve on the 1000 p.s.i.a. curve. This is equivalent to what the temperature compensator would do if it was characterized to fit the 2000 p.s.i.a. curve.

While the discussion, supra, has been confined to the action of the temperature compensator, the same difficulties are involved in the proper design or characterization of the pressure compensator, as would be observed if a similar set of curves were plotted for volume vs. pressure. This is true to a lesser degree because the pressure correction factor curves do not have so much curvature as the temperature correction factor curves do.

Steam behaves almost like a perfect gas when referred to degrees of superheat. This factor is taken into account in the design of means for measuring superheat for compensating purposes. FIG. 8 illustrates volume variations of steam at various pressure plotted against degrees of superheat instead of total temperature. From FIG. 8, it is apparent at a glance, that a temperature compensator, shaped or characterized to the 2000 p.s.i.a. line and which is responsive to degrees of superheat instead of total temperature, will perform acceptably at 1000 p.s.i.a. also. This superheated steam appears to behave almost like a perfect gas when referred to degrees of superheat.

In order to make use of the characteristics of steam when referred to degrees of superheat, the proper selection of a base is required. Much can be done to minimize compensation errors by careful selection of base lines so as to encounter zero or minimum error at the temperature and pressure conditions under which most of the steam will be metered. The following examples illustrate generally used methods of compensation.

EXAMPLE I

*Constant Temperature and Pressure Base*

If temperature compensation is to be set up with respect to pressure and temperature in an application where it is expected that the bulk of the steam will be metered at 2000 p.s.i.a. and 1000° F., data is obtained from the steam tables.

From the steam tables, a temperature correction curve can be calculated for the 2000 p.s.i.a. condition and a pressure correction curve can be likewise calculated for the 1000° F. condition. The specific volume taken from the steam tables for the 2000 p.s.i.a., 1000° F. condition is $V_b=0.3940$. The correction factor for this condition, is, of course, 1.000. The correction factor for any other condition is calculated thus:

$$F=\sqrt{\frac{V \text{ (base)}}{V \text{ (actual)}}}=\sqrt{\frac{0.3940}{V \text{ (actual)}}}$$

The values shown infra were calculated in this manner and the curves of FIGS. 9 and 10 were plotted from the values thus obtained.

PRESSURE CORRECTION FACTORS AT 1000° F.

| Pressure, p.s.i.a. | V (actual) | $\frac{V \text{ (base)}}{V \text{ (actual)}}$ | $fp = \sqrt{\frac{V \text{ (base)}}{V \text{ (actual)}}}$ |
|---|---|---|---|
| 2,000 | 0.3940 | 1.000 | 1.000 |
| 1,800 | 0.4425 | 0.8904 | 0.9436 |
| 1,600 | 0.5032 | 0.7830 | 0.8849 |
| 1,400 | 0.5811 | 0.6780 | 0.8234 |
| 1,200 | 0.6853 | 0.5749 | 0.7582 |
| 1,000 | 0.8306 | 0.4744 | 0.6888 |
| 800 | 1.0486 | 0.3757 | 0.6129 |
| 600 | 1.4115 | 0.2791 | 0.5283 |
| 400 | 2.1367 | 0.1844 | 0.4294 |

TEMPERATURE CORRECTION FACTORS AT 2000 p.s.i.a

| Temp., ° F. | V (actual) | $\frac{V \text{ (base)}}{V \text{ (actual)}}$ | $ft = \sqrt{\frac{V \text{ (base)}}{V \text{ (actual)}}}$ |
|---|---|---|---|
| 1,000 | 0.3940 | 1.000 | 1.000 |
| 900 | 0.3528 | 1.1168 | 1.0568 |
| 800 | 0.3067 | 1.2846 | 1.1334 |
| 700 | 0.2498 | 1.5773 | 1.2559 |
| 635 | 0.1879 | 2.0969 | 1.4481 |

The values in the foregoing tables were plotted to provide the curves of FIGS. 9 and 10.

A pressure compensator which is characterized according to the curve of FIG. 9 and a temperature compensator which is characterized according to FIG. 10, will produce theoretically correct compensation so long as the steam is at 2000 p.s.i.a. or 1000° F. That is, so long as the steam is at 2000 p.s.i.a., the temperature compensator will be theoretically correct throughout its range, or so long as the steam is at 1000° F., the pressure compensator will theoretically operate correctly throughout its range. But this theoretically correct operation is subject to error when the steam conditions are off both base lines. FIG. 11 shows the theoretical compensation errors for conditions which are off the two base lines. These errors result because the compensation curves are shaped correctly only for the base conditions. When off base, the product of the two factors applied by the compensating mechanism is not the same as the combined correction factor that would be obtained by referring to the specific volume tables. For example, let conditions of 800° F. and 1600 p.si.a. be assumed. Referring to FIGS. 9 and 10, the pressure and temperature correction factors are, respectively, 0.885 and 1.1334. The product of these two factors is 1.0039, the combined correction factor produced by the compensating mechanism.

But, from the steam tables, the correction factor should be the base volume divided by the actual volume all under the theoretical. Thus, $$\sqrt{\frac{0.3940}{0.4031}} = 0.9886$$

the error which is directly the difference between the two or 1.43%. This point lies somewhere between the 1% and the 2% error lines of FIG. 11.

The data for FIG. 11 was developed by repeating the calculations for the data of the table supra many times, and it graphically illustrates the difficulties confronting this type of compensation system when there is departure from both base lines.

A second method, which is that to which this invention is primarily directed, is the superheat base method. The difficulty indicated supra in connection with the first method can be minimized by referring the temperature compensation to the degrees of superheat instead of total temperature of the steam. Such a compensator must measure the difference between the actual steam temperature and the saturation temperature corresponding to the actual pressure.

The difference between the actual steam temperature and the saturation temperature corresponding to the actual pressure may be conveniently determined by means of a special sampling nozzle (to be described infra) which takes steam from the steam line and reduces it to saturation, and by means of an amplifier and a thermocouple system, a voltage is obtained that is proportional to the difference between saturation temperature and actual temperature which is the degrees of superheat.

If the temperature compensator is characterized with reference to the 2000 p.s.i.a. base line as before, and caused to respond to variations in superheat instead of total temperature, the pressure compensator can then be characterized to respond to pressure variations at the 200° F. superheat base. The performance of such a compensator throughout the temperature-pressure envelope is represented by FIG. 12. A compensator so characterized gives accurate results over a wide range of operations such as are encountered in the start-up or shut-down of a large power boiler. FIGURE 12 shows how large an area lies within the 1% error line which indicates the wide range of substantially errorless compensation that can be obtained by compensating from pressure and superheat both with reference to a base superheat.

A third method of compensation may be obtained by employing a predetermined "trend" base as represented by FIG. 12. In such a case, the temperature compensator is characterized along a predetermined "trend" line instead of along a pressure base line. The "trend" line can be established by the boiler manufacturer from information as to the probable temperature and pressure conditions to be encountered when starting-up or shutting-down the boiler. Zero theoretical error is then encountered along the "trend" line shown in FIG. 12. Such a system involves compensation from measurement of total temperature. The pressure compensator is shaped or characterized to the 1000° F. base line, but the area within the 1% error line is relatively small compared to the area of the 1% error line of FIG. 11.

Thus, from the curves illustrated and described supra, it is apparent that when pressure and temperature compensation of head-type steam flow meters is characterized from actual pressure at a base superheat and from a temperature correction factor based on superheat with respect to a base superheat, steam flow measurements with head-type meters can be compensated for pressure and temperature over a wide range of pressures and superheat. As will be shown in the following, the superheat measurements are conveniently and readily obtained and converted into correction factors which operate in conjunction with pressure factors with reference to a base superheat.

The data and teaching connected with the second method of correcting a head-type steam flow meter from actual pressure and superheat both with reference to a base superheat, may be accomplished in accordance with the following.

Figure 1:
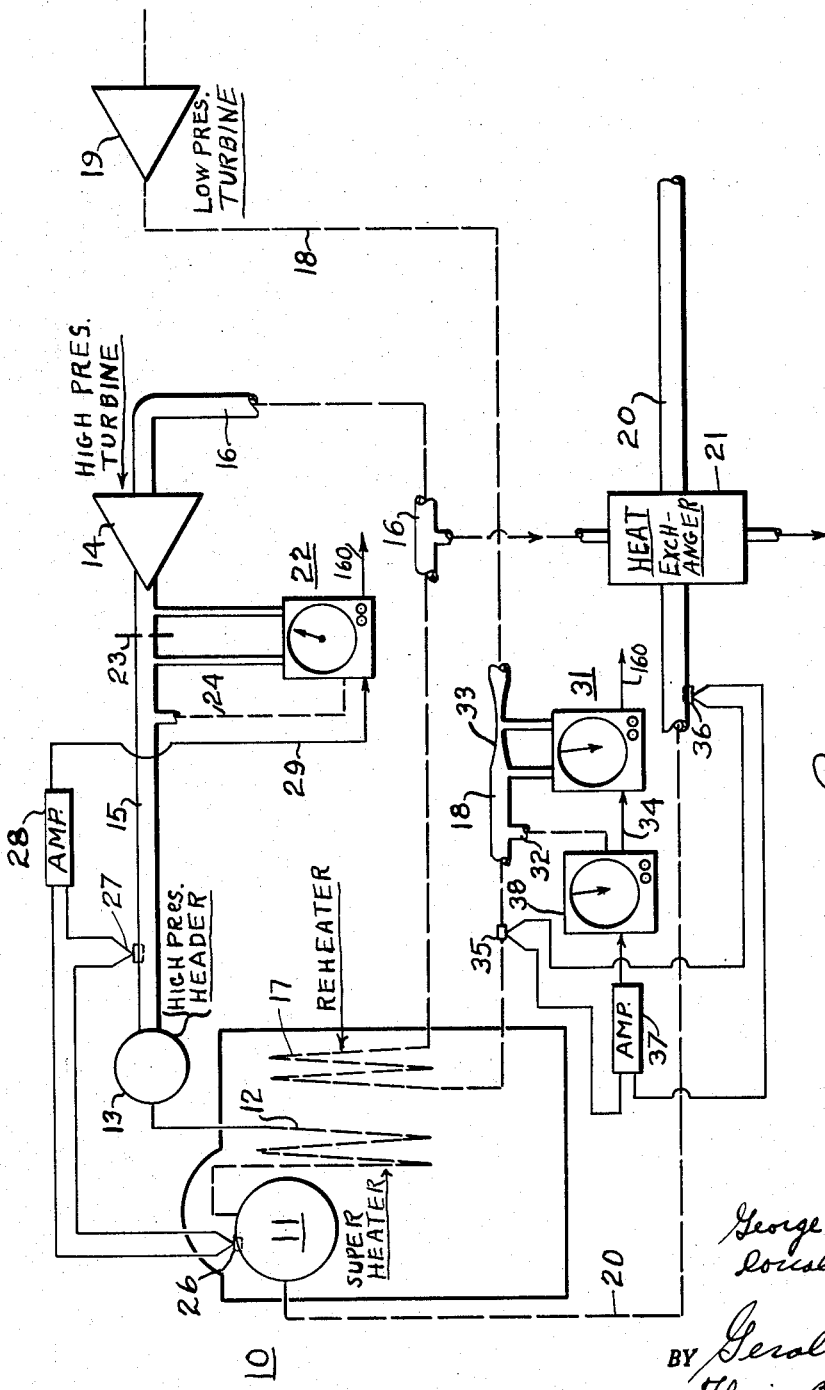

In FIG. 1 of the drawings a steam boiler 10 is shown more or less diagrammatically that includes a steam drum 11, a superheater 12, and a high pressure header 13. The header 13 may supply steam to a high pressure turbine 14 through a steam line 15. The exhaust steam from the turbine 14 is returned through a pipe 16 to a reheater 17 in the boiler. The reheated steam is delivered through a line 18 to a low pressure turbine 19.

Feed water is supplied to the drum 11 by a feed water line 20. That feed water passes through a heat exchanger 21 supplied with steam from the high pressure turbine exhaust line 16.

In the system of FIG. 1, a head-type meter 22 is provided for measuring the steam flow to the high pressure turbine 14, the meter sensing or responding to the pressure difference across an orifice 23 in the line 15. Instead of an orifice, a pressure difference may be developed in a venturi or by the flow resistance of a length L of steam line. The meter is provided with a steam pressure connection 24 located upstream from the orifice 23, a preselected distance, whereby the meter may be corrected for actual steam pressure with respect to a base superheat. The meter is also provided with a correction factor signal that is proportional to the difference between the superheat and saturated steam temperatures, whereby a correction factor with reference to a base superheat is obtained. The saturated steam temperature may be taken at the boiler drum 11, while the superheat temperature may be taken at a selected location in the line 15. These temperatures are sensed by thermocouples 26 and 27 located at the boiler drum 11 and in the steam line 15 downstream from the header 13. Since the steam discharging from the drum 11 to the steam line 15 passes through the superheater 12, there is a substantial pressure drop between the drum and the steam line 15 at the location of the thermocouple 27; thus, there is superheat at the location of that thermocouple.

Since the saturated steam temperature of the boiler does not vary considerably from one pressure to another, and does not fluctuate nearly as widely as the superheat temperature does, the meter 22 is corrected for changes in the superheat with reference to a base superheat in accordance with the curves and tables discussed supra. As shown in FIG. 1, the thermocouples 26 and 27 are connected in series so that the net output voltage is proportional to the difference between the superheat and the saturated steam temperatures. That voltage may be converted to A.C. by a suitable chopper and supplied to an amplifier 28.

The output voltage of amplifier 28 is rectified and converted into a signal, which may be pneumatic signal, as shown in FIG. 5, and delivered through a signal line 29 to the meter.

Figure 4:
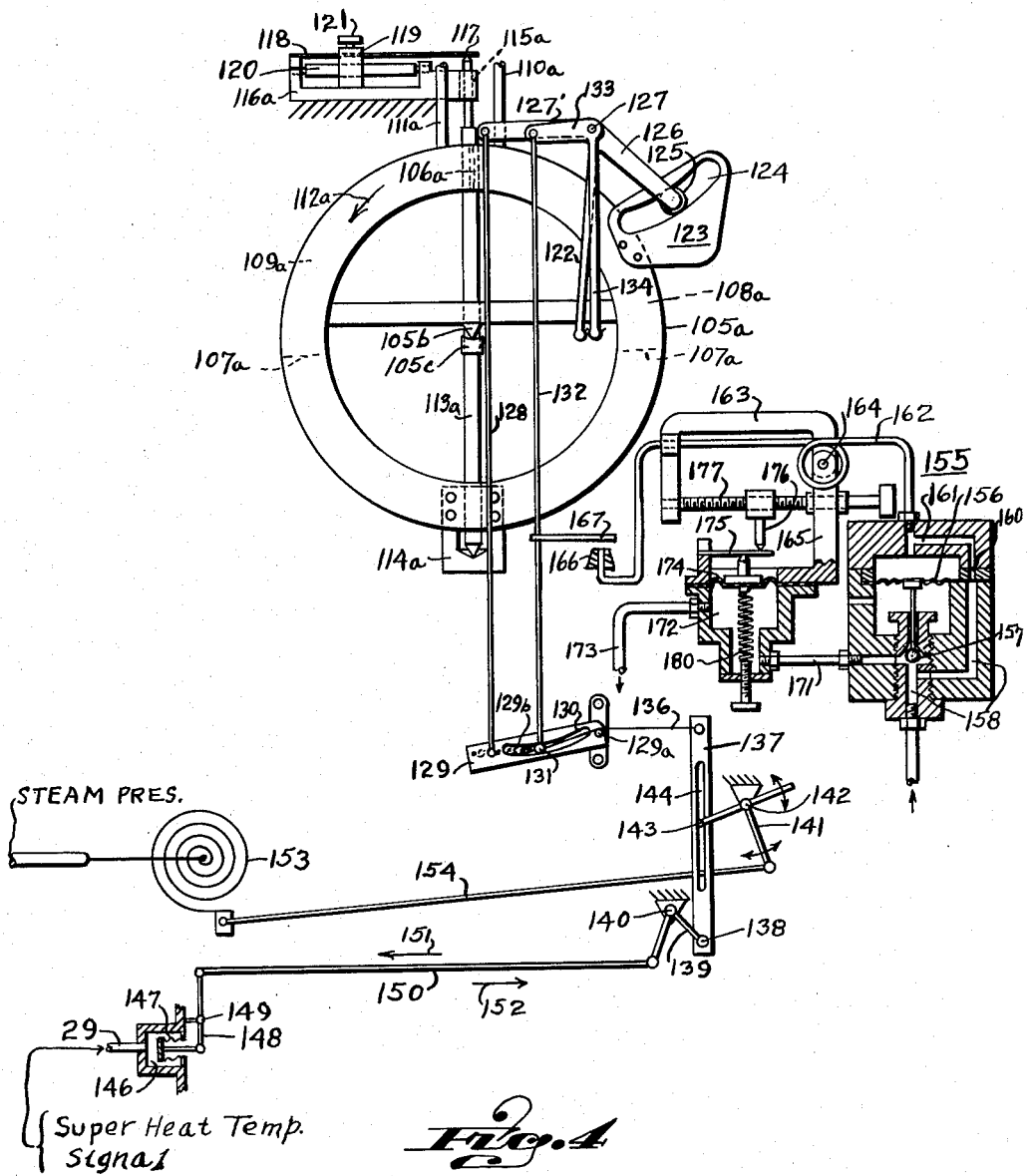
FIG. 4 is a more or less diagrammatic view of a head-type steam flow meter of the ring balance design adapted to respond to a pressure difference generated by the flow of the steam to be measured and which is provided with means for correcting the flow indication of the meter from pressure at a base superheat and superheat with respect to a base superheat.

FIGURE 4 illustrates how the steam pressure correction factors and the superheat correction factors are interacted to produce a resultant temperature-pressure correction factor. That factor causes the meter to produce a steam flow indication that is a true measure of the instantaneous rate of steam flow in pounds. The meter may, as is customary, be provided with an integrator for establishing the total steam flow in a given period of time. That meter may also, as shown in FIG. 4, be provided with means of generating an output signal that is proportional to the corrected steam flow indication or measurement.

Thus, the meter 22 reads accurately the weight of steam flow delivered by the boiler to the high pressure turbine 14, as expressed by the equation $$Q = K\sqrt{h} \times \sqrt{\frac{V \text{ (base)}}{V \text{ (actual)}}}$$

Where Q is steam flow in pounds shown, $h$ is the pressure difference, V is the specific volume at base pressure and temperature and (V actual) the actual specific volume.

In cases where large boilers are supplying steam to high pressure turbines from start-up, the superheat temperature will fluctuate quite widely, that is, the superheat temperature range is quite wide. By the arrangement just described, and as set forth in the curves of the drawings, the meter 22 provides a steam flow reading that is accurately corrected for steam pressure and variations in superheat.

As shown in FIG. 1, a meter 31 is provided that senses the steam flow in the line 18 that supplies steam to the low pressure turbine 19 from the reheater 17. That meter is provided with a steam pressure connection 32 upstream from a venturi 33, to which the meter 31 responds and by which the actual steam pressure correction factor means of the meter is actuated.

Meter 31 is also supplied with a temperature correction factor signal through a signal line 34 that is proportional to the difference between the temperature in the feed water line 20 on the discharge side of the exchanger 21 and the temperature in the line 18 on the discharge side of the reheater 17. The temperature of the water after it leaves the heat exchanger 21 is substantially that of the saturated steam temperature in the boiler. The temperature in line 18, after (post) the reheater 17, has substantial superheat. That superheat of course varies over a wide range as the boiler is brought from start-up to full load.

The temperature correction factor for the meter 31 is generated by the voltage difference between voltages of thermocouples 35 and 36 that are responsive to the temperatures in the low pressure turbine supply line 18 and the feed water line 20 after the heat exchanger 21. That voltage difference may be supplied as A.C. to an amplifier 37 the output of which is rectified and supplied to a meter 38 whereby the superheat temperature is recorded and whereby the correction factor signal is delivered to the line 34. The meter 38 may be eliminated if desired and the temperature output signal of the amplifier 37 may, as shown in FIG. 5, be utilized to generate a pneumatic signal.

Thus, by the system of FIG. 1, the total instantaneous flow of steam as well as the integrated flow in pounds per hour, corrected for steam pressure and superheat both with respect to a base superheat, may be obtained; also a similar accurate reading may be obtained for the steam supplied to a low pressure turbine, as corrected for steam pressure and superheat.

The two measurements above mentioned provide an accurate method of determining steam flow and the efficiency of the boiler system as a whole.

Figure 2:
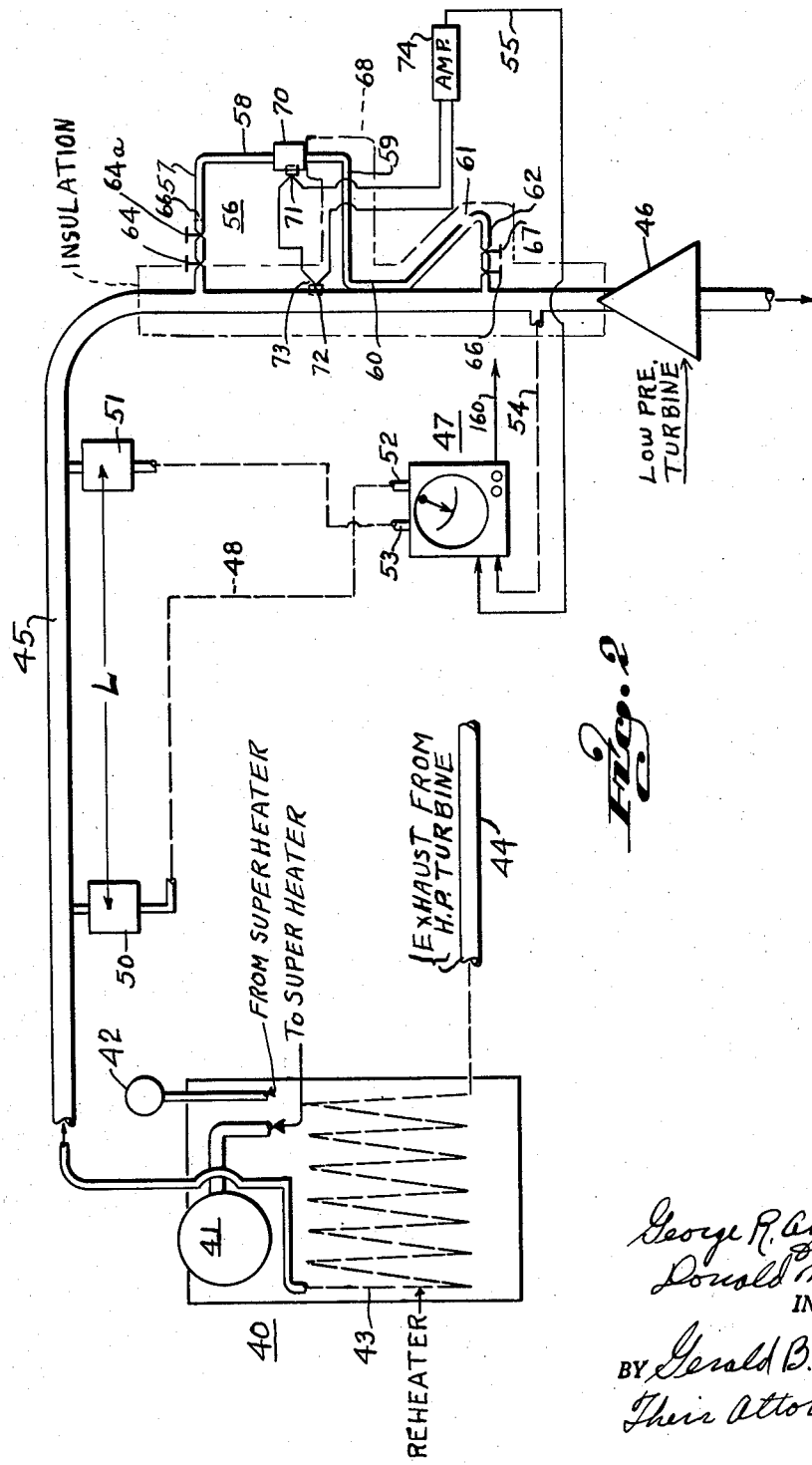

In FIGURE 2, a boiler 40 is shown having the usual steam drum 41. The superheat and its connections from the drum to the high pressure header 42 have been omitted. The boiler is provided with a reheater 43 to which steam is supplied from the exhaust of a high pressure turbine through a line 44. The steam, after passing through the reheater, is delivered to a line 45 that supplies a low pressure turbine 46.

A meter 47 is provided for measuring the total weight of steam flow from the reheater to the low pressure turbine 46. The meter responds to the pressure drop developed in a length L of the line 45. That pressure drop is supplied to the meter 47 by a connection 48 at the high pressure side of pipe length L and a pressure connection 49 at the downstream end thereof. The pressure connections may be made through suitable condensate separating devices 50 and 51 that lead to the high and low pressure connections 52 and 53 of the meter.

The meter 47 is provided with a steam pressure correction connection 54 that is connected into the steam line 45 upstream of the low pressure turbine 46. The temperature correction factor is supplied through a signal line 55. The signal in that line is proportional to the superheat in the steam with reference to a base superheat as delivered to the low pressure turbine 46 because the saturated steam temperature is substantially constant.

FIGURE 2 illustrates, schematically, a convenient means 56 for virtually simulating the saturated and the superheat temperatures in the line 45. Means 56 comprises a by-pass pipe having a leg portion 57 connected into the line 45 and extending substantially at right angles thereto; a down leg 58; a return leg 59 extending substantially at right angles to the pipe 45; a leg portion 60 that lies along the pipe 45 in good thermal contact therewith; a leg portion 61 that runs outwardly from the pipe 45; and a leg portion 62 extending substantially at right angles to the pipe 45. The leg portion 62 re-enters the steam line 45 in advance of the steam pressure connection 53. In the leg 57 are shut off valves 64 and 64a and an orifice 65 and in the leg 62 are shut off valves 66 and 67.

As shown, the lower portion of the down leg 58, the leg portions 59, 61 and 62 are heavily lagged with insulation 68. The leg portion 57 from the valve 64a and the upper portion of leg 58 are exposed to ambient temperature so that steam condenses therein.

At a location adjacent to, but above the insulation 68, the down leg 58 is provided with a thermocouple well 70 containing a thermocouple 71. The steam pipe 45 is provided with a thermocouple well 72 located between the connection of leg portion 57 to the pipe 45 and the leg 59. In that well is a thermocouple 73. The thermocouples 71, and 73 are connected in series and the resultant output voltage thereof is supplied to an amplifier 74 similar to the amplifiers shown in FIG. 1.

The steam flowing in the uncovered leg portions 57 and 58 condenses so that the thermocouple 71 senses saturated steam temperature. The condensed steam in the leg portions 59, 61, and 62 is re-evaporated by heat from pipe 45 into steam so that the condensate formed in the portions 57 and 58 may re-enter the steam line 45 as steam rather than as water. As the thermocouple 73 senses the superheat in the steam, the difference between the voltage of thermocouples 73 and 71 reflects and is a measure of the superheat in the steam.

The thermocouple voltage received by the amplifier 74 is amplified and converted into a signal such as a pneumatic signal. That signal is transmitted through line 54 to the meter 46. Thus, the output of meter 46 reflects a true and accurate measure of the rate of steam flow through the line 45 to the low pressure turbine 46 as corrected for steam pressure and superheat, both with reference to a base superheat.

Figure 3:
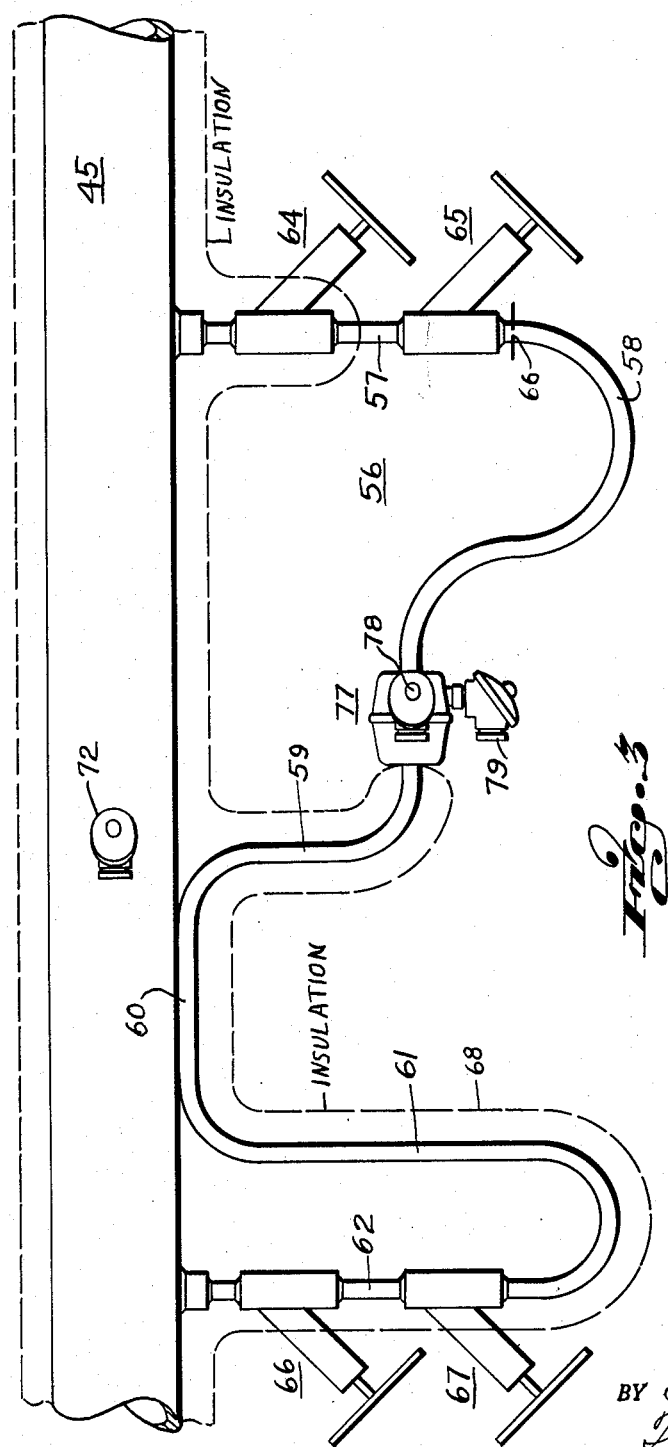
FIG. 3 is an enlarged plan-view of a steam line provided with a device for simulating saturated steam temperatures and superheat temperatures, said device being shown schematically in FIG. 2.

FIGURE 3 illustrates more in detail the means 56 and the manner in which it may be constructed. The branch 57 is provided with an orifice 65 adjacent valve 64a whereby the expansion of steam flowing through it generates superheat. These leg portions and the valves are solidly connected into the steam line by pressure-tight welds. The lower portion of the leg 58 is provided with a coupling 77 containing one or more thermocouple wells to provide replacement stand-bys in case of a burn out. As shown, that coupling may be provided with two thermocouple wells 78 and 79, one of them being a replacement in case of failure of the other.

Also, as shown in FIG. 3, the steam line is heavily lagged with insulation as is the portion of leg 57 containing the valve 64. The portions 59, 60, 61, and 62 are also heavily lagged with insulation as is the portion of leg 57 containing the valve 64. The portions 59, 60, 61, and 62 are also heavily lagged. The lagging commences at the fitting 77 containing the thermocouple wells. The condensed steam in the branch 58 flows downwardly through the branch 60 which, being in firm thermal contact with the steam line, flashes the condensate into steam so that it re-enters the steam line as steam.

FIGURE 5 illustrates schematically a thermocouple amplifier signal circuit that may be embodied in FIGS. 1 and 2. The numerals applied to this circuit are those applied to the amplifier 28 and the thermocouples associated therewith. The same circuit and signal sending device is embodied in the amplifier 37 with its thermocouples 35 and 36, and the amplifier 74 with its thermocouples 71 and 73 of FIG. 2.

As shown in FIG. 5, the thermocouples 26 and 27 (TC1 and TC2) respond, respectively, to saturated steam temperature and total steam temperature. These couples, being connected in series, are made a part of a potentiometer circuit P.C. from which a D.C. voltage is delivered to a chopper 81 that converts the output into A.C. voltage which is amplified by the amplifier 28. The output of the amplifier is supplied to a reversing motor M that drives a wiper contact 82 of a slide wire 83 constituting the balancing leg of the potentiometer circuit. The wiper contact 82 is driven by an output shaft 84 of a gear reduction 85, the input shaft of which is connected to the armature of motor M. The gear reduction 85 is also provided with an output shaft 86 in which is a cam 87 that positions a flap or baffle 88 controlling a jet 89 of a pneumatic amplifier 90. The pneumatic amplifier generates a signal which is transmitted through a signal line 29 to the temperature compensating mechanism of the steam flow meter. The mechanical output may also be applied directly to the compensation linkage.

The motor M comprises an A.C. field winding 91 that is excited by alternating supply voltage E and armature direction reversing windings 92, 93 and 94 and 95 which are connected in series across the output terminals of the amplifier 28. A condenser C is connected across the output terminals leading to the windings 92-95, respectively. When the output level of the amplifier 28 is of a certain value, the armature of motor M rotates in one direction and when it is of another value, the field is reversed with respect to the field of winding 91 so that the motor runs in the opposite direction. The motor will run in one direction or another until the measuring circuit is balanced by the positioning of the wiper contact 82 along the slide-wire 83, the armature being at rest at balance.

The pneumatic amplifier 90 comprises a housing assembly having diaphragms (a) and (b) therein. As shown, the diaphragm (a) is larger than diaphragm (b) so that the output signal of the amplifier may be modified with respect to the operating signal established in chamber C by the position of the flap 88 with respect to the outlet of the jet 89, which, as shown, is connected by a pipe 97 to chamber C.

Diaphragm (b) is acted upon by pressure in chamber (d) established by a stem 98 having ball valves 99 and 100 at the opposite ends thereof that control, respectively, an inlet port 101 and an exhaust port 102 leading to a chamber 103 between the diaphragms (a) and (b) from which chamber the pressure exhausts to the atmosphere through a port 104. Operating pressure is supplied to chamber C and to the body 105 containing the inlet port 101 by a supply pipe 106. Pressure of a predetermined constant value is supplied to that pipe by a source not shown.

The pneumatic pressure is admitted into chamber C through an orifice (e). The rate of flow through that orifice determines the pressure in chamber C and consequently the force developed by diaphragm (a), which acts in opposition to the force developed by the pressure in chamber B on diaphragm (b). The flow of air through the orifice (e) is determined by the rate at which air escapes from the nozzle 89 which in turn is determined by the position of the baffle 88 with respect to the tip of that nozzle.

As the baffle 88 is moved towards the nozzle 89, the discharge of air through it is diminished, whereby the pressure in chamber C increases causing the diaphragm (a) to move upwardly and lift ball 99 off the inlet port 101, thereby admitting pressure in chamber (d) until the force of that pressure on diaphragm (b) balances the opposing force developed by diaphragm (a). When in balance, both the inlet and the exhaust ports are closed. The pressure thus established in chamber (d) is delivered through the signal sending line 29 to the meter.

In order to provide a follow-up action with respect to the motion of the baffle 88 with reference to the jet 89, the jet pipe 97 is secured to a lever 110 mounted on a pivot 111. The lever 110 is actuated by the repositioning or reset diaphragm 112 of a pressure receiving housing 113 to which the signal pressure of chamber (d) is delivered by a pipe 114. Thus, if the baffle 88 is moved towards the jet 89 to increase the output signal pressure from chamber (d), the pressure in chamber 113 is increased whereby the diaphragm pushes upwardly on the lever 110 rotating it clockwise until balance is established in the pneumatic amplifier.

Thus, for every position of baffle 88 there will be a definite output signal pressure generated in chamber (d) of the amplifier 90.

The means disclosed in FIG. 5 may be embodied in meter 38 and arranged to operate a pen or pointer to indicate the superheat of the steam in line 16 leading to the low pressure turbine 19 or to any other device. In that case, the output signal is delivered through line 34 to the meter 31.

The meters 22, 31 and 47 of FIGS. 1 and 2 may be constructed as shown in FIG. 4. Each meter comprises a hollow ring 105a having a partition 106a at its highest point when in neutral position. The ring is supported at its center by a knife edge 105b mounted in a way 105c. The ring contains a quantity of heavy liquid, such as mercury, for example, to the level indicated by line 107a. Thus, the mercury and the partition 106a divide the interior of the ring into chambers 108a and 109a. The highest pressure of a steam flow differential is connected to chamber 108a through a pressure connection 110a, and the lowest pressure of that differential is connected to chamber 109a through a connection 111a. Thus, as a pressure differential develops across the partition 106a, the ring 105a rotates in a counterclockwise direction as indicated by the arrow 112a.

In order that the angular motion of the ring may be caused to be proportional to the square root of the difference between the pressures in chambers 108a and 109a and thereby be linearly proportional to the steam flow, a square rooting mechanism is provided. That mechanism comprises a rod 113a having a cone pointed lower end which is seated in a way 114a carried by the lower portion of the ring at a location diametrically opposite the baffle 106a. The upper end of that rod passes through a guide bushing 115a of a support member 116a mounted in a stationary position on a support indicated by the hatch lines. The upper end of the rod 113a engages the free end of a cantilever spring 117, the stationary end of which is secured to the support 116a at 118. The length of the spring, depending upon the characteristics required, may be adjusted by means of a block 119 that is slidable along the support 116a and through which the spring extends. The block is guided by a rod 120 supported in the member 116a. The spring may be secured to the block in its adjusted positions by means of a locking screw 121.

When the ring is in the position shown in FIG. 4, it is in neutral, so-called, and that pressure differential acting on the partition 116a may be regarded as being zero. As the differential increases, the ring rotates counterclockwise and as it rotates, the rod 113a exerts a force against the free end of spring 117 in such a manner that the resistance increases as a function of the cube root of the pressure difference acting on the partition 106a. Thus, the angular motion of the ring 105a is linearly proportional to the steam flow to the 3/2 power.

Motion of the ring is imparted to an uncorrected steam flow pen arm 122 by means of a cam 123 secured to the ring and which is provided with a cam slot 124 in which a cam follower 125 rides. The follower is carried by the end of an arm of a bell crank 126 rotatably mounted on a fixed pivot 127. The shape of the cam slot 124 is such that the motion of the uncorrected pen arm 122 will be proportional to the $\sqrt{h}$ or steam flow.

The ball crank 126 has an arm 127 connected to a link 128, which is connected at its lower end to a compensating lever 129 having a curved slot 130 therein. A cross head 131 carried by the lower end of a corrected steam flow link 132 travels in the slot 130. The compensating lever 129 is actuated in accordance with the uncorrected steam flow motion of the ring 125, but the motion of the corrected steam flow link 132 is governed by the position of the cross head which is governed by the pressure and temperature correction mechanism.

The corrected steam flow link 132 is connected at its upper end to a bell crank 133 which is pivoted on the pivot 127 and operates a corrected steam flow pen arm 134.

The cross head 131 is connected by a cable 136 to a radial coupling lever 137 whereby the crosshead may be moved to the right towards the pivot 129a of the compensating lever 129 or towards the free end of that compensating lever by means of a spring 129b.

The lower end of lever 137 is pivotally mounted at 138 on one arm of a bell crank 139, where the lower end of the coupling 137 may be rotated with reference to the pivot 140 for the bell crank. The lever 137 is also provided with a bell crank 141 that pivotally is supported on a pivot 142. One arm of that bell crank is provided with a pin 143 that operates in a slot 144 in the lever 137. Rotation of the bell crank 141 about the pivot 142 will cause the radial coupling 137 to rotate in one direction or the other about the pivot pin 138. Similarly, motion of the bell crank 139 with reference to the bell crank 141 will cause the lever to pivot about the pivot pin 143 that rides in the slot 144.

The bell crank 139 is operated by the pneumatic signal generated in the signal amplifier 90 as transmitted by pipe 29. That pressure signal is received by a housing 146 in which is a pressure deflectable member 147, such as a bellows, connected to one end of a lever 148 mounted on a pivot 149. The lever 148 is connected to the bell crank 139 by a link 150, whereby the radial coupling 137 is operated from the superheat connection factor.

As the superheat increases, lever 148 rotates counterclockwise, thereby moving the link 150 in the direction of arrow 151 whereby the lower end of the coupling 137 is rotated clockwise about the pin 143 assuming there has been no motion of the bell crank 141. If there has been motion, the lower end of the coupling moves to the left. As the superheat decreases, the motion is in the opposite direction, namely, in the direction of arrow 152. The actual steam pressure is supplied to a pressure sensitive device, such as a Bourdon tube 153. The free end of that tube is connected by a link 154 to the bell crank 141. Increasing pressures cause the bell crank to rotate clockwise about its pivot 142, decreasing pressures causing it to rotate in the opposite direction.

The radial coupling 137 together with the bell cranks 139 and 141 and the compensating bar 129 are so designed with reference to the correction factor characteristics indicated by the curves in FIGS. 9, 10, and 11, that the crosshead 131 will be in the position that is required to give it a vertical motion reflecting the true steam flow as corrected from actual pressure and superheat with respect to a base superheat.

Motion of the corrected steam flow link 132 may be utilized to control the operation of a signal generator 155 by which a signal may be developed for transmitting a true steam flow signal to a remote point or for controlling, for example, the rate of feed water input to a boiler in accordance with the total weight of steam withdrawn therefrom.

The signal generator or controller 155 may be of the form shown at D in FIG. 1 of Donald M. Stough Patent No. 2,841,162, granted July 1, 1958. The controller 155 comprises a body 155' provided with a metal diaphragm 156 having inherent spring characteristics tending to resist pressure imposed on it. The diaphragm 156 positions a valve 157 towards or away from an inlet port 158 in the body. The inlet port 158 is connected to a source of supply of pressure at constant value, and communicates with a chamber above diaphragm 156 by means of a passage 159, an orifice 160, and a passage 161. Passage 161 leads to a jet pipe tube 162, carried by an inverted U-shaped yoke 163 which is pivoted at 164 on a support 165. The free end of the jet pipe is provided with a nozzle or jet 166 through which air issues.

The rate at which air issues from the jet is controlled by a baffle 167 carried by the steam corrected link 132. If the jet baffle 167 moves towards the jet nozzle so as to restrict the flow of air from it, pressure builds up on the diaphragm 161 causing it to move the valve 157 towards the inlet port, thereby decreasing the signal output pressure thereof. That pressure passes through a pipe 171 into a diaphragm chamber 172, and passes from that chamber into a signal transmitting pipe 173, for controlling apparatus operating a meter located at remote point where it may be desirable to show the total steam flow.

Associated with the diaphragm chamber 172 is a means for repositioning the jet with respect to the baffle 167 so as to stabilize the controller. That means includes a diaphragm 174 that so operates a cantilever spring 175 and a push rod 176 carried by a screw 177 journaled in the frame 163 as to rotate the jet pipe about the pivot 164. If the pressure decreases in the chamber 172, as when the baffle 167 moves away from nozzle 166, the frame 163 rotates counterclockwise about pivot 164 thereby moving the jet towards the baffle until there is balance between position of baffle and the output signal. The diaphragm 174 is biased by spring 180 in such a direction that for each value of pressure in the chamber 172 there will be a definite position of the diaphragm and the nozzle 167.

If the baffle 169 is moved away from the jet, the pressure on the diaphragm 156 is reduced because of the increased flow of air through the nozzle which results in a reduction in pressure at the orifice 160. Thus, the diaphragm 156 moves upwardly allowing more pressure to be received in the diaphragm housing 172, whereby the nozzle 166 is moved towards the baffle 167 to establish a pressure required by the position of the corrected steam flow link 132.

The signal transmitted by pipe 173 may be utilized as above stated for purposes of indicating at a remote point the actual flow of steam as corrected for superheat and pressure with reference to a base superheat, or it may be utilized in what is called a "Three-element Feed Water Regulating System" to cause the feed water to be delivered to the boilers in substantially direct proportion to the corrected weight of steam delivered by the boilers to turbines and its auxiliaries.

A three-element feed water system in which the signal delivered by pipe 169 may be used, is shown and described in Patent No. 2,904,017, issued September 15, 1959, to George R. Anderson et al. and assigned to the assignee of this application.

The signal line 173 of this application may be connected to the receiving element C of the totalizer 26, the receiving element C of that patent being supplied with the steam flow signal pressure through signal pipe 28a thereof.

Having thus described the invention, it will be apparent to those of ordinary skill in the art to which the invention pertains that various modifications and changes may be made in the illustrated embodiments without departing from either the spirit or the scope of the invention.

Therefore, what is claimed as new and desired to be secured by Letters Patent is:

1. Apparatus for measuring steam flow in a steam line corrected for pressure and superheat, said steam line having means for developing a pressure difference (P1—P2) proportional to the square of the steam flow, said apparatus comprising a meter having an element responsive to said pressure difference and capable of producing motion proportional thereto, means for converting the motion of said pressure responsive element into a linear motion proportional to the square root of the motion of said pressure difference responsive element, a pivotally mounted compensating member actuated by said converting means, said compensating member having a crosshead slidably connected thereto for motion towards or away from said pivot, a corrected steam flow indicator means actuated by said crosshead, means responsive to the steam pressure for producing motion proportional thereto, means for developing a voltage difference proportional to the difference between the saturated and the total temperatures of said steam, means for converting said voltage difference into a signal proportional to said temperature difference, means for developing a motion proportional to said superheat temperature signal, and means actuated by said difference signal and said steam pressure motion developing means for actuating said crosshead by an amount proportional to the product of the motion of said steam pressure responsive means and said difference signal motion means whereby the corrected steam flow indicating means is positioned in accordance with the flow of steam as corrected for pressure and superheat.

2. In combination with a steam generating boiler having a superheater connected to a steam flow line and steam consuming devices supplied by said boiler, means in said line for developing a pressure difference, a steam flow meter having means responsive to said pressure difference for producing a motion proportional thereto, an uncorrected flow indicator, a square root extractor actuated by said pressure difference responsive means for imparting a motion thereto and to said indicator that is proportional to the square root of said pressure difference, a corrected flow indicator adjustably connected to said uncorrected indicator and adapted to be actuated thereby, means responsive to the difference between the saturated and the superheat temperatures of the steam for providing a motion related thereto, means responsive to the steam pressure and provided with means for producing a motion related thereto and means responsive to the motions of said superheat temperature and pressure-responsive means for causing said corrected flow indicating means to be actuated with reference to the uncorrected indicator to show steam flow corrected for pressure and superheat.

3. A combination as in claim 2 in which means actuated by said corrected flow indicator are provided for generating a signal proportional to the position thereof.

4. In a device for simulating saturated temperature and superheat in a conduit carrying steam at changing rates of flow and pressure, said device comprising a portion of the steam line, a by-pass connected at its opposite ends to said steam line portion, said by-pass having at its upstream end an orifice for developing a pressure drop, a portion of said by-pass contiguous to said orifice being exposed to ambient temperature, said by-pass having a steam flashing portion contiguous to said exposed portion and disposed in firm thermal contact with the steam line portion, and having another portion contiguous to said flashing portion extending outwardly from said steam line portion to a return bend connected to the downstream end of said pipe portion, insulation on all of said portions but the exposed portion, whereby steam condenses in the exposed portion to provide saturated steam temperature and the steam flashing portion converting the condensate to steam before returning the same to the steam line portion, the steam line portion providing a source of total temperature and steam pressure whereby the combination provides a source of total and saturated steam temperatures and the steam line portion providing a source of steam pressure, whereby a steam flow meter may be provided with steam pressure and superheat correction factors for correcting the flow of the meter in accordance with said factors.

References Cited in the file of this patent
UNITED STATES PATENTS

| | | |
|---|---|---|
| 1,525,807 | Gibson | Feb. 10, 1925 |
| 1,721,556 | Harrison | July 23, 1929 |
| 2,570,410 | Vetter | Oct. 9, 1951 |
| 2,710,015 | Donaldson | June 7, 1955 |